(12) United States Patent
Xiao et al.

(10) Patent No.: US 9,053,367 B2
(45) Date of Patent: Jun. 9, 2015

(54) DETECTOR EVOLUTION WITH MULTI-ORDER CONTEXTUAL CO-OCCURRENCE

(71) Applicant: Seiko Epson Corporation, Tokyo (JP)

(72) Inventors: Jing Xiao, Cupertino, CA (US); Yuanyuan Ding, Santa Clara, CA (US); Guang Chen, Columbia, MO (US)

(73) Assignee: Seiko Epson Corporation, Tokyo (JP)

( * ) Notice: Subject to any disclaimer, the term of this patent is extended or adjusted under 35 U.S.C. 154(b) by 55 days.

(21) Appl. No.: 14/044,766

(22) Filed: Oct. 2, 2013

(65) Prior Publication Data

US 2014/0133742 A1 May 15, 2014

Related U.S. Application Data

(60) Provisional application No. 61/724,829, filed on Nov. 9, 2012.

(51) Int. Cl.
| | |
|---|---|
| *G06K 9/62* | (2006.01) |
| *G06K 9/00* | (2006.01) |
| *G06K 9/46* | (2006.01) |
| *G06K 9/72* | (2006.01) |
| *G06K 9/80* | (2006.01) |

(52) U.S. Cl.
CPC .......... *G06K 9/00664* (2013.01); *G06K 9/4671* (2013.01); *G06K 9/72* (2013.01); *G06K 9/80* (2013.01)

(58) Field of Classification Search
CPC ....... G06K 9/00664; G06K 9/80; G06K 9/72; G06K 9/4671; G06K 9/00711; G06K 9/00718
See application file for complete search history.

(56) References Cited

U.S. PATENT DOCUMENTS

| | | | |
|---|---|---|---|
| 2009/0167672 A1* | 7/2009 | Kerofsky | 345/102 |
| 2010/0027892 A1* | 2/2010 | Guan et al. | 382/203 |
| 2012/0219211 A1* | 8/2012 | Ding et al. | 382/159 |
| 2012/0328092 A1 | 12/2012 | Kudo | |

OTHER PUBLICATIONS

Li, C., et al., "Automatic Discovery of Groups of Objects for Scene Understanding", 2012 IEEE Conference on Computer Vision and Pattern Recognition (CVPR), Jun. 16-21, pp. 2735-2742.

(Continued)

*Primary Examiner* — Brian Le

(57) ABSTRACT

Aspects of the present invention comprise generating and using Multi-Order Contextual co-Occurrence (MOCO) descriptors to implicitly model the high level context using detection responses from a baseline object detector. In embodiments, a $1^{st}$-order context feature is computed as a set of randomized binary comparisons on a response map of the baseline object detector. The statistics of the $1^{st}$-order binary context features are further calculated to construct a higher-order co-occurrence descriptor, which, in embodiments, may be combined with other features such as the $0^{th}$-order context features and/or the $1^{st}$-order features to form the MOCO. In embodiments, combining the MOCO feature with the original image feature, the baseline object detector may be evolved to a stronger context aware detector.

16 Claims, 14 Drawing Sheets

(56) References Cited

OTHER PUBLICATIONS

Cinbis, R., et al., "Contextual Object Detection Using Set-based Classification", Proceedings of the EP Conference on Computer Vision, Oct. 2012.

Everingham, M., et al., "The PASCAL Visual Object Classes (VOC) Challenge", Int. J. Comput. Vis., 2010, pp. 303-338.

Dollar, P., et al., "Pedestrian Detection: An Evaluation of the State of the Art", IEEE Trans on Pattern Analysis and Machine Intelligence, 2011.

Felzenszwalb, P.F., et al., "Object Detection with Discriminatively Trained Part Based Models", IEEE Trans. Pattern Anal. Mach. Intell., 2010.

Girshick, R.B., et al., :Discriminatively trained deformable part models, version 5, Sep. 5, 2012, http://people.cs.uchicago.edu/~rbg/latent-release5.

Zhu, L., et al., "Latent Hierarchical Structural Learning for Object Detection", CVPR, 2010, IEEE, pp. 1062-1069.

Friedman, J., et al., "Additive Logistic Regression: A Statistical View of Boosting", Annals. of Statistics 2000, vol. 28, No. 2, pp. 337-407.

Li, C., et al., "Extracting Adaptive Contextual Cures from Unlabeled Regions", ICCV'11 Proceedings of the 2011 International Conference on Computer Vision, pp. 511-518.

Song, Z., et al., "Contextualizing Object Detection and Classification", CVPR 2011.

Vedaldi, A., et al., "Multiple Kernels for Object Detection", ICCV, 2009.

Zhang, J., et al., "Boosted Local Structured HOG-LBP for Object Localization", CVPR 2010.

\* cited by examiner

400

For at least some of the pairs of pixels used in generating the 1st order co-occurrence binary values, obtaining closeness vectors ― 405

Compute a histogram of the distribution of binary values (or a portion thereof) using the corresponding closeness vectors ― 410

Compute a higher-order co-occurrence descriptor as a cross product of the histogram ― 415

Generate a multi-order contextual co-occurrence (MOCO) descriptor/feature comprising the 1st-order co-occurrence features and the higher-order co-occurrence features ― 420

Algorithm 1: Detection Evolution

Input: Pre-trained deformable-part-model $\Psi_0$ with $N_c$ components, each containing $N_p$ part filters; training data set $S_{train}$; detection accuracy rate (*e.g.* average precision) $\delta_0$ of $\Psi_0$ on $S_{train}$; convergence threshold $\xi$.

Output: Iteratively evolved detectors $\Psi_1, \ldots, \Psi_{N_d}$

Set $R = 0$

Do

1. $R = R + 1$, $N_d = R$.

2. for $i = 1 \rightarrow N_c$ do

1). Extract the image feature $f_I$ according to the $i_{th}$ component of $\Psi_{(R-1)}$ on $S_{train}$.

2). Compute the detector response maps on $S_{train}$ using $\Psi_{(R-1)}$.

3). For each detection candidate $\dot{P}$, compute the $1^{st}$-order and high-order context descriptors on $\Omega(\dot{P})$ according to Eq.(3,4,5) for each of the $N_p$ part filter responses, resulting multiple MOCOs as $[\mathbf{f}_c, \mathbf{f}'_{c_1}, \ldots, \mathbf{f}'_{c_{N_p}}]$ 4). Do feature selection using Boosting [ † ] on $[\mathbf{f}_I, \mathbf{f}_c, \mathbf{f}'_{c_1}, \ldots, \mathbf{f}'_{c_{N_p}}]$, to learn the informative features $\mathbf{f}_{L_i}$ for the $i_{th}$ component.

5). Bootstrap and retrain the evolved detector for the $i_{th}$ component.

3. Bootstrap and retrain the evolved detector $\Psi_R$ via latent-SVM [ ‡, T̄ ] for fusing the responses from the $N_c$ evolved component detectors.

4. Evaluate the detection rate $\delta_R$ on $S_{train}$ using $\Psi_R$.

While $\delta_R - \delta_{(R-1)} > \xi$;

---

† = E.g., Ref. 5

‡ = E.g., Ref. 3

T̄ = E.g., Ref. 4

| | plane | bike | bird | boat | bottle | bus | car | cat | chair | cow | table | dog | horse | motor | person | plant | sheep | sofa | train | tv | mAP |
|---|---|---|---|---|---|---|---|---|---|---|---|---|---|---|---|---|---|---|---|---|---|
| Leo [†] | 29.4 | 55.8 | 9.4 | 14.3 | 28.6 | 44.0 | 51.3 | 21.3 | 20.0 | 19.3 | 25.2 | 12.5 | 50.4 | 38.4 | 36.6 | 15.1 | 19.7 | 25.1 | 36.8 | 39.3 | 29.6 |
| CMO [††] | 31.5 | 61.8 | 12.4 | 18.1 | 27.7 | 51.5 | 59.8 | 24.8 | 23.7 | 27.2 | 30.7 | 13.7 | 60.5 | 51.1 | 43.6 | 14.2 | 19.6 | 38.5 | 49.1 | 44.3 | 35.2 |
| Det-Cls [‡] | 38.6 | 58.7 | 18.0 | 18.7 | 31.8 | 53.6 | 56.0 | 30.6 | 23.5 | 31.1 | 36.6 | 20.9 | 62.6 | 47.9 | 41.2 | 18.8 | 23.5 | 41.8 | 53.6 | 45.3 | 37.7 |
| Oxford [*] | 37.6 | 47.8 | 15.3 | 15.3 | 21.9 | 50.7 | 50.6 | 30.0 | 17.3 | 33.0 | 22.5 | 21.5 | 51.2 | 45.5 | 23.3 | 12.4 | 23.9 | 28.5 | 45.3 | 48.5 | 32.1 |
| NLPR [**] | 36.7 | 59.8 | 11.8 | 17.5 | 26.3 | 49.8 | 58.2 | 24.0 | 22.9 | 27.0 | 24.3 | 15.2 | 58.2 | 49.2 | 44.6 | 13.5 | 21.4 | 34.9 | 47.5 | 42.3 | 34.3 |
| Ver.5 [T̄] | 36.6 | 62.2 | 12.1 | 17.6 | 28.7 | 54.6 | 60.4 | 25.5 | 21.1 | 25.6 | 26.6 | 14.6 | 60.9 | 50.7 | 44.7 | 14.3 | 21.5 | 38.2 | 49.3 | 43.6 | 35.4 |
| Test Emb. | 41.0 | 64.3 | 15.1 | 19.5 | 33.0 | 57.9 | 63.2 | 27.8 | 23.2 | 28.2 | 29.1 | 16.9 | 63.7 | 53.8 | 47.1 | 18.3 | 28.1 | 42.2 | 53.1 | 49.3 | 38.7 |

Table 4: Comparison with the state-of-the-art performance of object detection on PASCAL VOC 2007 (trainval/test).

† = Ref. 6
†† = Ref. 7
‡ = Ref. 8
\* = Ref. 9
\*\* = Ref. 10
T̄ = Ref. 4

FIGURE 10

DETECTOR EVOLUTION WITH MULTI-ORDER CONTEXTUAL CO-OCCURRENCE

CROSS-REFERENCE TO RELATED APPLICATION

This application claims the priority benefit under 35 USC §119(e) to commonly assigned and co-pending U.S. Patent Application No. 61/724,829, filed on Nov. 9, 2012, entitled "DETECTION EVOLUTION WITH CONTEXT CO-OCCURRENCE," and listing as inventors Jing Xiao, Yuanyuan Ding, and Guang Chen. The aforementioned patent document is incorporated by reference herein in its entirety.

BACKGROUND

1. Field of Invention

The present patent document is directed towards systems and methods for object detection. More particularly, the present patent document is directed towards systems and methods for generating and using object detection models for recognizing objects in an image (video or still image).

2. Description of the Related Art

Detecting objects from static images is an important and yet highly challenging task and has attracted much interest of computer vision researchers in the recent decades. Some of the difficulties with object detection originate from various aspects, including large intra-class appearance variation, objects deformation, perspective distortion and alignment issues caused by view point change, and the categorical inconsistency between visual similarity and functionality.

According to the recent results of a standards-making PASCAL grand challenge, the detection approach based on sliding window classifiers are presently the predominant method. Such methods extract image features in each scan window and classify the features to determine the confidence of the presence of the target object. They are further enriched to incorporate sub-part models of the target objects and the confidences on sub-parts are assembled to improve detection of the whole objects.

One key disadvantage of these approaches is that only the information inside each local scanning window is used: joint information between scanning windows or information out of the scanning window are either thrown away or heuristically exploited through post-processing procedures such as non-maximum suppression. Naturally, to improve detection accuracy, context in the neighborhood of each scan window can provide rich information and should be explored. For example, a scanning window in a pathway region is more likely to be a true detection of human than the one inside a water region. There have been some efforts on utilizing contextual information for object detection and a variety of valuable approaches have been proposed. High level image contexts, such as semantic context, image statistics, and three-dimensional (3D) geometric context, are used as well as low level image contexts, including local pixel context and shape context.

Besides utilizing context information from the original image directly, other lines of work including Spatial Boost, Auto-Context, and their extensions integrate the classifier responses from nearby background pixels to help determine the target pixels of interest. These works have been applied successfully to solve problems such as image segmentation and body pose estimation. Contextual information directly from the responses of multiple object detectors has also been explored. In other approaches, the co-occurrence information among different object categories is extracted to improve the performance in various classification tasks. Such methods require multiple base object classifiers and generally necessitate a fusion classifier to incorporate the co-occurrence information, making them expensive and sensitive to the performance of individual base classifiers.

Thus, prior context-related approaches either required multiple models for different object of interests or did not consider higher order information when using models for an object of interest.

Accordingly, systems and methods are needed that better perform object detection using contextual information.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the scope of the invention to these particular embodiments.

FIG. 4 depicts a method for generating a multi-order contextual co-occurrence (MOCO) descriptor/feature according to embodiments of the present invention.

FIG. 7 depicts a detector evolution methodology according to embodiments of the present invention.

FIG. 10 is a table (Table 4) that illustrates a comparison of a test embodiment of the present methodology with state-of-the-art methods, wherein the test embodiment stably outperforms the baselines methods in all 20 categories.

DESCRIPTION OF THE PREFERRED EMBODIMENTS

Figure 1:
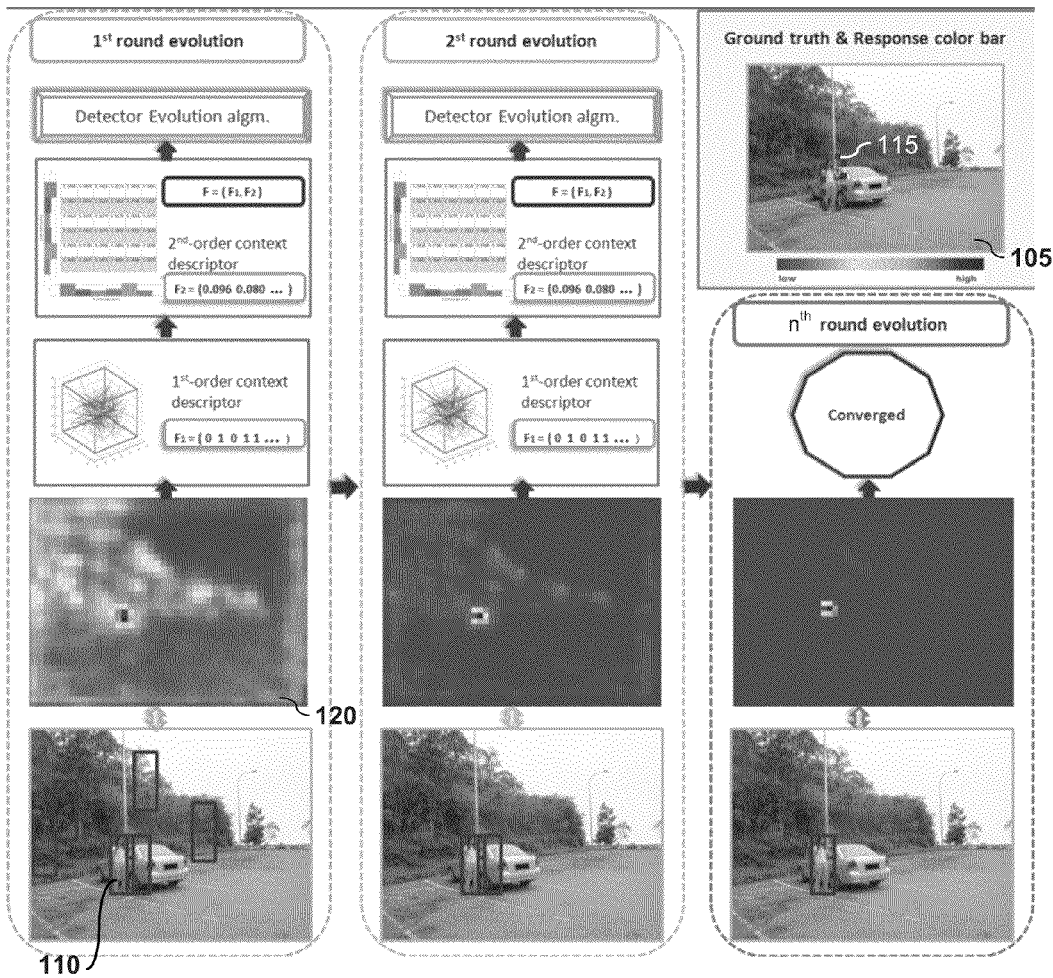
FIG. 1 graphically presents a multi-order contextual co-occurrence detection evolution example according to embodiments of the present invention.

In the following description, for purposes of explanation, specific details are set forth in order to provide an understanding of the invention. It will be apparent, however, to one skilled in the art that the invention may be practiced without these details. Furthermore, one skilled in the art will recognize that embodiments of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases in various places in the specification are not necessarily all referring to the same embodiment or embodiments. It shall be noted that the use of the terms "set" and "group" in this patent document shall include any number of elements. Furthermore, it shall be noted that methods or algorithms steps may not be limited to the specific order set forth herein; rather, one skilled in the art shall recognize that certain steps may be performed in different orders, including being done contemporaneously.

It shall be noted that although embodiments described herein may be within the context of images (still or video), the invention elements of the current patent document are not so limited. Accordingly, aspects of the invention elements may be applied or adapted for use in other contexts and/or on other input sensor data.

1. Introduction & Overview

Presented in this patent document are embodiments of systems and methods for developing effective and generic approaches to utilize contextual information without resorting to the multiple object detectors. The rationale is that, even though there is only one classifier/detector, higher-order contextual information, such as the co-occurrence of objects of different categories, can still be implicitly and effectively used by carefully organizing the responses from a single object detector. Since only one classifier is available, the co-occurrence of different object types cannot be explicitly encoded as the multi-class approaches. However, the difference among the responses of the single classifier on different object regions implicitly conveys such contextual information. It shall be noted that other embodiments and other inventive aspects of the current patent document may be applied to multiple object detector implementations.

By way of illustration and not limitation, FIG. 1 graphically illustrates multi-order contextual co-occurrence detection evolution according to embodiments of the present invention. The responses of a pedestrian detector to various object regions such as the sky, streets, and trees, may vary greatly, but a homogeneous region of the response map corresponds to a region with semantic similarity. Actually, the initial response map 120 in FIG. 1 can lead to a rough tree, sky and street segmentation. This reasoning hints a possibility to encode higher order contextual information with single object detection response. Therefore, if the single classifier response map is treated as an "image," descriptors may be extracted to represent higher order contextual information.

Embodiments of the multi-order context representation presented herein were inspired by the recent success of randomized binary image descriptors. In embodiments, a series of binary features, where each bit encodes the relationship of classification response values for a pair of pixels, is generated. The difference of detector responses at different pixels implicitly captures the contextual co-occurrence patterns pertinent to detection improvements. Recent research also shows that image patches could be more effectively classified with higher-order co-occurrence features. Accordingly, also presented herein are embodiments of novel higher-order contextual descriptors based on the binary pattern of comparisons. In embodiments, the higher-order contextual descriptor captures the co-occurrence of binary contextual features based on their statistics in the local neighborhood. The context features at all different orders are complementary to each other and are therefore combined together to form a multi-order context representation.

Finally, in embodiments, the multi-order context representations may be integrated into an iterative classification framework, where the classifier response map from the previous iteration is further explored to supply more contextual constraints for the current iteration. This process is related to the contextual boost methodology described in commonly-assigned U.S. Patent Publication No. 2012/0219211, published on Aug. 30, 2012, entitled "Contextual Boost for Object Detection," listing Yuanyuan Ding and Jing Xiao as inventors—the foregoing patent document is incorporated herein by reference in its entirety and for all purposes. Since the multi-order contextual feature encodes the contextual relationships between neighborhood image regions, through iterations it naturally evolves to cover greater neighborhoods and incorporates more global contextual information into the classification process. As a result, aspects of the present invention effectively enable the detector evolving to be stronger across iterations. By way of illustration and not limitation, the "detector evolution" framework presented herein is showcased using a successful deformable part models as an initial baseline detector. Extensive experiments confirm that embodiments of the framework achieve better accuracy monotonically through iterations. In embodiments, the number of iterations may be determined in the training stage when the detection accuracy converges. Using the PASCAL VOC 2007 datasets (which is discussed in "The PASCAL Visual Object Classes (VOC) Challenge," International Journal of Computer Vision (2010), by M. Everingham, L. Van Gool, C. K. I. Williams, J. Winnu, and A. Zisserman [hereinafter, "Reference 1" or "Ref. 1"], which document is incorporated by reference herein), the present methodology outperforms all state-of-the-art approaches, and improves by 3.3% over prior deformable part models in mean average precision. On the Caltech dataset (which is described by P. Dollar, C. Wojek, B. Schiele, and P. Perona in "Pedestrian detection: An evaluation of the state of the art," IEEE Transactions on Pattern Analysis and Machine Intelligence (TPAMI), 2011 [hereinafter, "Reference 2" or "Ref. 2"], which is incorporated by reference herein), the present methodology further reduces the log-average miss rate from 48% to 46% and the miss rate at 1 (one) False Positive Per Image (FPPI) from 25% to 23%, as compared with the best results achieved by contextual boost in U.S. Patent Publication No. 2012/0219211.

2. Multi-order Context Representation

Figure 2:
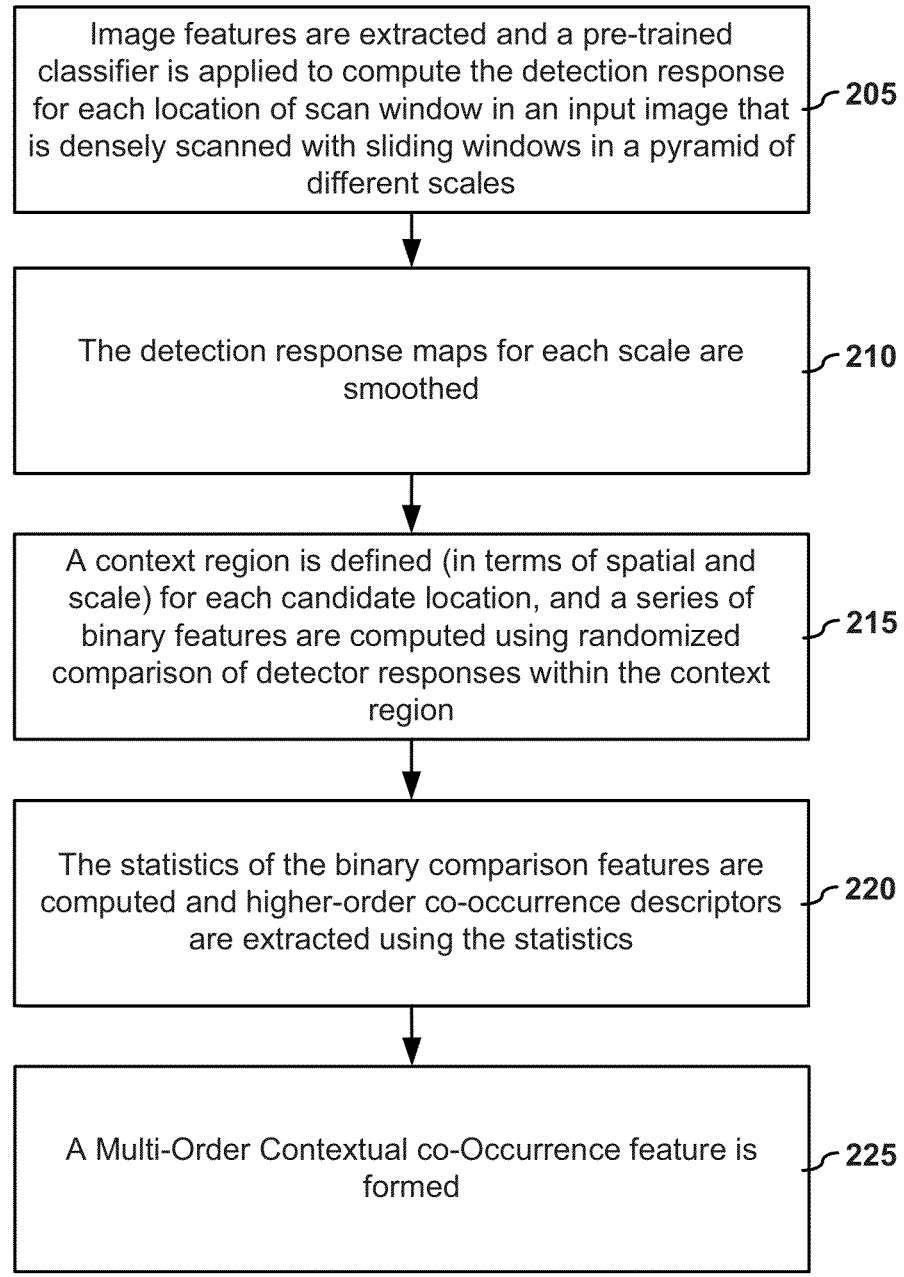
FIG. 2 depicts a flow chart for constructing a multi-order context representation from an image according to embodiments of the present invention.
Figure 3:
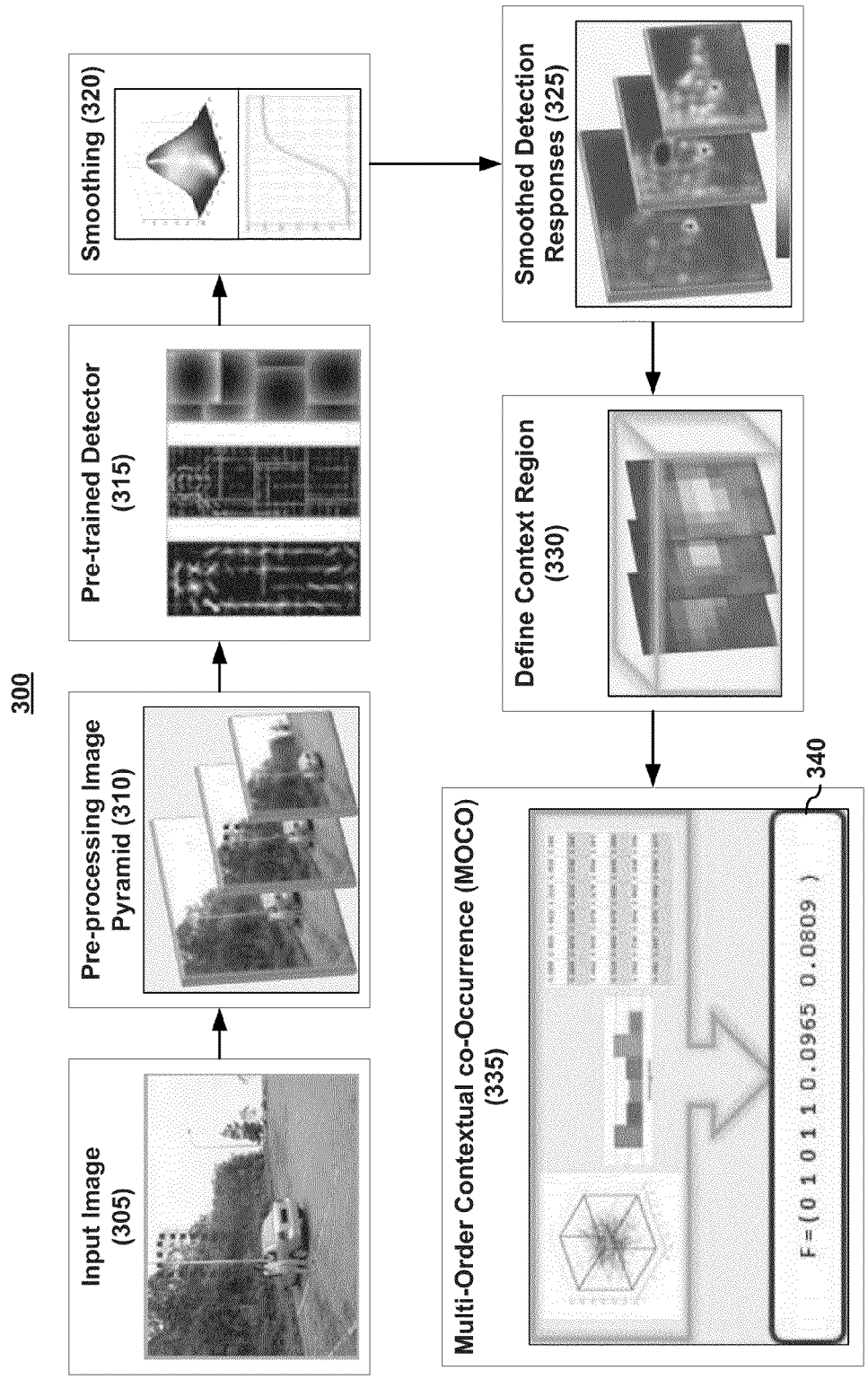
FIG. 3 graphically depicts a summary flow chart for constructing a multi-order context representation from an image according to embodiments of the present invention.

FIG. 2 depicts a flow chart for constructing a multi-order context representation from an image according to embodiments of the present invention. FIG. 3 graphically depicts a summary flow chart for constructing a multi-order context representation from an image according to embodiments of the present invention. In embodiments, the image 305 is first densely scanned (205) with sliding windows in a pyramid of different scales. For each location of scan window, image features are extracted and a pre-trained classifier (e.g., 315) is applied to compute (205) the detection response. In embodiments, the detection response maps for each scale are smoothed (210/320), as discussed in more detail in Section 2.a. (below), to obtain smoothed detection responses 325. In embodiments, the context region 330 may be defined (215) in terms of spatial and scale for each candidate location, and a series of binary features are computed (215) using randomized comparison of detector responses within the context region, as discussed in more detailed in Sec. 2.b. (below). Statistics of the binary comparison features are computed (220) and higher-order co-occurrence descriptors are extracted (220), as discussed in more detail in Sec. 2.c. (below). In embodiments, two or more levels may be combined to construct the Multi-Order Contextual co-Occurrence (MOCO) descriptors 340.

a. Context Basis ($0^{th}$ Order)

Intuitively, the appearance of the original image patch containing the neighborhood of target objects provides important contextual cues. However, it is difficult to model this kind of context in the original image because the neighborhood around target objects may vary dramatically in different scenarios. A logical approach to this problem is: firstly, convolve the original image with a particular filter to reduce the diversity of the neighborhood of a true target object as foreground with various backgrounds; and then extract context feature from the filtered image. For object detection tasks, it may be preferred that such a filter be detector driven. Given the observation from FIG. 1 that the positive responses (depicted by the rectangles in image 110) cluster densely around humans but occur sparsely in the background, the object detector may be taken as this specific filter and directly extract context information from the classification response map, denoted as $\mathcal{M}$.

Since the value range of the classification response is $[-\infty, +\infty]$, in embodiments a logistic regression is adopted to map the value at each pixel s into a grayscale value $s' \in [0, 255]$.

$$s' = \frac{255}{1 + \exp(\alpha \cdot s + \beta)}, \quad (1)$$

where $\alpha = -1.5$, $$\beta = -\frac{\eta}{\alpha},$$

and $\eta$ is the pre-defined classifier threshold. Equation (1) turns the response map into a "standard" image, denoted as $\mathcal{M}'$.

The detection responses are usually noisy. To construct context feature from $\mathcal{M}'$, In embodiments, Gaussian smoothing with kernel size 7*7 and std value 1.5 is performed to reduce noise sensitivity, as indicated in FIGS. 2 and 3. In the smoothed $\mathcal{M}$, each pixel $\dot{P}$ represents a local scan window in the original image and its intensity value indicates the detection confidence in the window. Such a response image thus conveys context information, which is denoted herein as $0^{th}$-order context.

In embodiments, a 3D lattice structure centered at $\dot{P}$ in spatial and scale space is defined. $\dot{P}$ is set as the origin of the local three-dimensional coordinate system, and each pixel a is indexed by a 4-dimension vector [x, y, l, s]. Here [x, y] refers to the relative location with respect to $\dot{P}$; l represents the relative scale level with respect to $\dot{P}$; and s means the value of the pixel a in the smoothed response image $\mathcal{M}$. Thus, for example, [2, 3, 2, 175] means the pixel a locates in the 2nd-level higher than $\dot{P}$, (2, 3) in (x, y)-dimensions relative to $\dot{P}$, with pixel value 175. The context structure $\Omega(\dot{P})$ around $\dot{P}$ in the spatial and scale space may be defined as:

$$\Omega(\dot{P}; W, H, L) = \left\{ (x, y, l, s) \middle| \begin{array}{l} |x| \le W/2 \\ |y| \le H/2 \\ |l| \le L/2 \end{array} \right\}, \quad (2)$$

where (W, H, L) determines the size and shape of $\Omega(\dot{P})$. For example, (1, 1, 1) means the context structure is a 3×3×3 cubic region.

In embodiments, if a portion of the context region is outside a boundary of the image, that portion of the context region may be filled with one or more values.

b. Binary Pattern of Comparisons ($1^{st}$-Order)

Given the $0^{th}$-order context structure, in embodiments, comparison-based binary features are used to incorporate the co-occurrence of different objects. Although, in embodiments, there is only a single object detector, the response values at different locations indicate the confidences of the target object existing. Therefore, each binary comparison encodes the contextual information of whether one location is more likely to contain the target object than the other.

i. Comparison of Response Values

Specifically, in embodiments, the binary comparison $\tau$ in the $0^{th}$-order context structure $\Omega(\dot{P})$ of size W×H×L is defined as:

$$\tau(s; a, b) := \begin{cases} 1 & \text{if } s(a) < s(b) \\ 0 & \text{otherwise,} \end{cases} \quad (3)$$

where s(a) represents the pixel value in $\Omega(\dot{P})$ at a=[$x_a$, $y_a$, $l_a$]. Naturally selecting a set of n (a, b)-location pairs inside $\Omega(\dot{P})$ uniquely defines a set of binary comparisons. In embodiments, the n-dimensional binary descriptors $f_n = [\tau_1, \tau_2, \ldots, \tau_n]$ is defined as a $1^{st}$-order context descriptor. However, care needs to be taken for selecting the n specific pairs for the descriptor.

ii. Randomized Arrangement

Figure 5A:
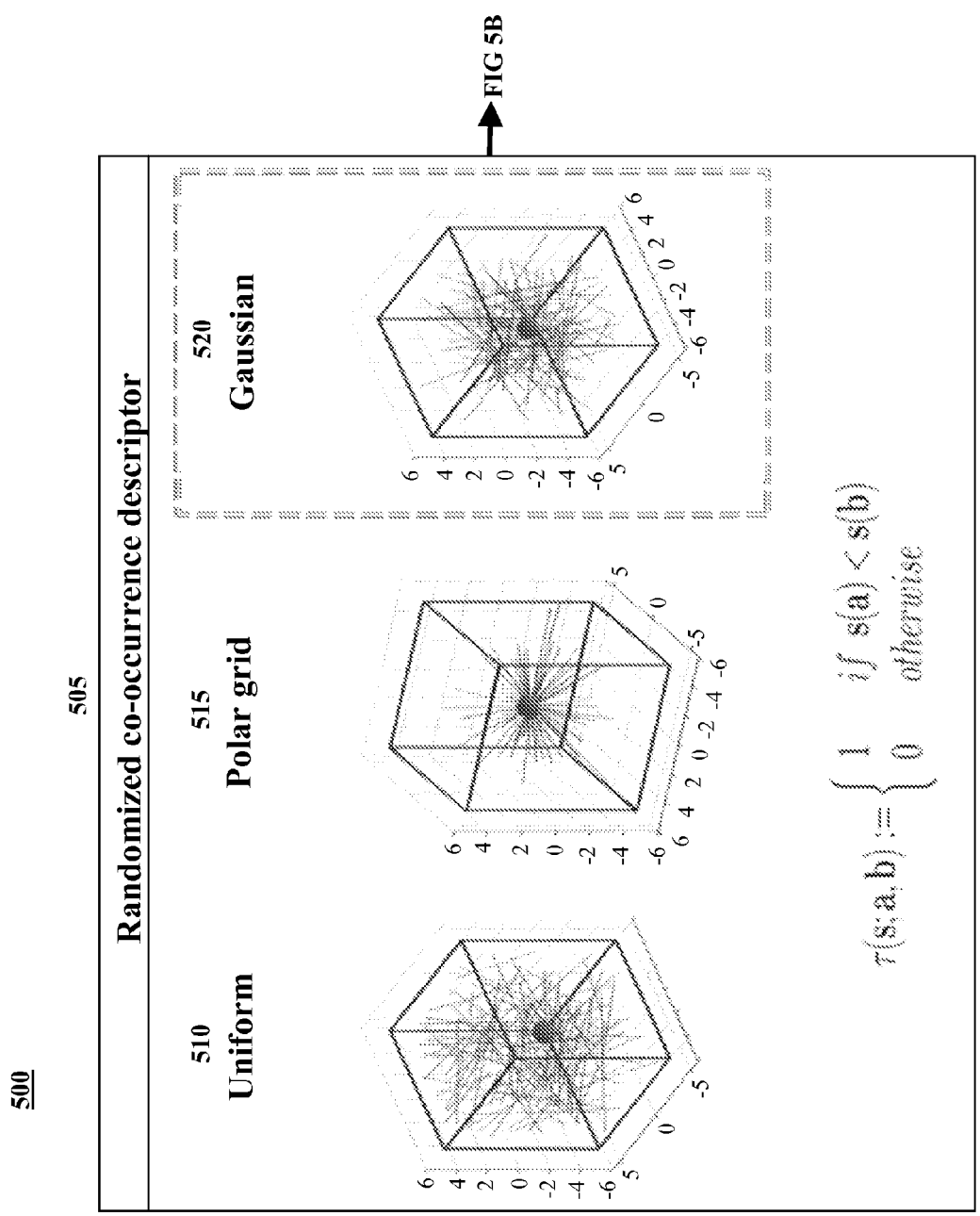
FIGS. 5A, 5B and 5C graphically depict generating a multi-order contextual co-occurrence (MOCO) descriptor/feature according to embodiments of the present invention.
Figure 5B:
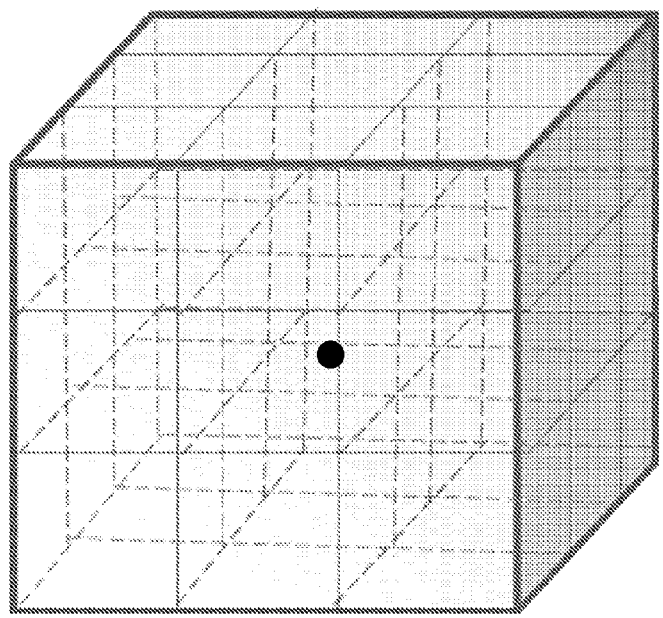
Figure 5C:
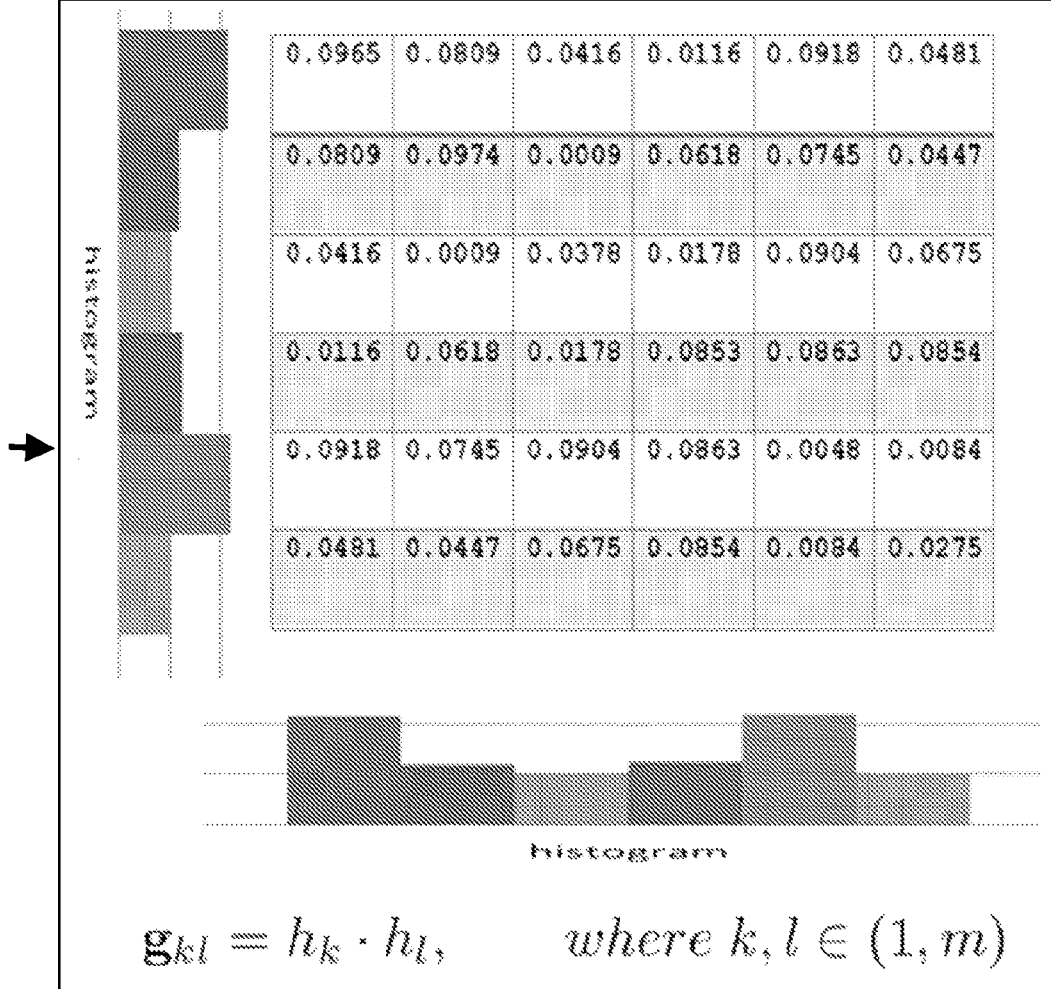

It shall be noted that there are numerous options for selecting n pairs of binary comparisons in Equation (3). As shown in FIG. 5, two extreme cases (510 and 515) of selection are:

Type (1) Uniform (510): The locations of each test pair ($a_i$, $b_i$) are evenly distributed inside $\Omega(\dot{P})$ and binary comparison $\tau_i$ can occur far from the origin point:

$$x_{a_i}, x_{b_i} \sim U\left(-\frac{W}{2}, \frac{W}{2}\right), i.i.d;$$

$$y_{a_i}, y_{b_i} \sim U\left(-\frac{H}{2}, \frac{H}{2}\right), i.i.d;$$

and $$l_{a_i}, l_{b_i} \sim U\left(-\frac{L}{2}, \frac{L}{2}\right), i.i.d;$$

Type (2) Polar (515): The locations of each test pair ($a_i$, $b_i$) concentrate heavily surrounding the origin: $\forall i \in (1,n), a_i = [0, 0, 0]$, and $b_i$ lies on any possible position on a coarse 3D polar grid.

Type (1) ignores the facts that the origin of $\Omega(\dot{P})$ represents the location of the detection candidates and thus the context near it might contain more important clues; while type (2) yields too sparse samples at the boarders of $\Omega(\dot{P})$ to stably capture the complete context information. To address these issues, in embodiments, a randomized approach:

Type (3) Gaussian (520): $a_i, b_i \sim \text{Gaussian}(\mu, \Sigma)$, i.i.d. $\mu = [0, 0, 0]$, and $$\Sigma = \begin{vmatrix} \varepsilon_1 \cdot W^2 & 0 & 0 \\ 0 & \varepsilon_2 \cdot H^2 & 0 \\ 0 & 0 & \varepsilon_3 \cdot L^2 \end{vmatrix}.$$

So $\Sigma$ is correlated with the size of context structure $\Omega(\dot{P})$, and in embodiments, the scaling parameters [$\varepsilon_1$, $\varepsilon_2$, $\varepsilon_3$] are set empirically as [0.15, 0.15, 0.15] that gave the best detection rate in experiments conducted by the authors.

The randomized binary features compare the $0^{th}$-order context in a set of random patterns and provides rich $1^{st}$-order context. The patterns of comparisons capture co-occurrence of classification responses within the context structure $\Omega(\dot{P})$. In embodiments, a higher-order context descriptor may then be constructed using the $1^{st}$-order context.

c. Higher-Order Co-Occurrence Descriptor

It has been shown that higher-order co-occurrence features help improve classification accuracy; thus, higher-order context information is exploited based on the co-occurrence and statistics of the $1^{st}$-order context.

FIG. 4 depicts a method for generating a multi-order contextual co-occurrence (MOCO) descriptor/feature according to embodiments of the present invention. As described above, $1^{st}$-order co-occurrence binary values may be obtained by comparing pairs of detector response values. In embodiments, for at least some of the pairs of pixels used in generating the $1^{st}$-order co-occurrence binary values, closeness vectors are obtained (405). Denote $f_n = [\Sigma_1, \tau_2, \ldots, \tau_n]$ as the randomized co-occurrence binary features, where $r_i$ corresponds to a comparison between two pixels $a_i = [x_{a_i}, y_{a_i}, l_{a_i}]$ and $b_i = [x_{b_i}, y_{b_i}, l_{b_i}]$. For each pair of pixels $a_i$ and $b_i$, a closeness vector may be defined as $v_i = [|x_{a_i}| - |x_{b_i}|, |y_{a_i}| - |y_{b_i}|, |l_{a_i}| - |l_{b_i}|]$, to measure the absolute difference of the locations of $a_i$ and $b_i$ in x-dimension, y-dimension, and l-dimension. For example, $|x_{a_i}| - |x_{b_i}| > 0$ implies that in x-dimension, $a_i$ is closer to the origin $\dot{P}$ than $b_i$. Thus $v_i$ measures whether $a_i$ or $b_i$ is closer to $\dot{P}$. This is an important measure as it can be easily observed that stronger detection responses occur in regions closer to the true positive locations. Accordingly, the distribution of $\tau_i$ with respect to $v_i$ contains important context cues. In embodiments, to compute a stable distribution that is robust against noise, each dimension is evenly divided into $\tau$ intervals yielding $m = t^3$ subregions (e.g., FIG. 5, item 530), and a histogram $h_m = [h_1, \ldots, h_m]$ is computed (410), as graphically indicated in FIG. 5, item 535.

Specifically, suppose $n_j$ co-occurrence tests fall into the j-th subregion and their values are $$\{\tau_{j_1}, \tau_{j_2}, \ldots, \tau_{j_{n_j}}\},$$

the corresponding histogram value $h_j$ is calculated as $$h_j = \begin{cases} \dfrac{\sum_{i=0}^{n_j} \tau_{j_i}}{n_j} & \text{if } n_j \neq 0 \\ 0 & \text{otherwise} \end{cases} \quad (4)$$

The higher-order co-occurrence descriptor is then constructed (415) as follows, $$f_p = \{g_{kl} | g_{kl} = h_k \cdot h_l, (k,l=1,\ldots,m)\}, \quad (5)$$

While the $1^{st}$-order co-occurrence features $f_n$ describes the direct pair-wise relationships between neighborhood positions in a local context, the higher-order co-occurrence features $f_n$ capture the correlations among such pair-wise relationships in the local context. Complementarily, they provide rich context cues and may be combined into a Multi-Order Contextual co-Occurrence (MOCO) descriptor, which may be defined as $f_c = [f_n, f_p]$ (420). In embodiments, the MOCO descriptor may include the $0^{th}$-order context as well. In yet other embodiments, the MOCO descriptor may include some combination of the $0^{th}$-order context, the $1^{st}$-order co-occurrence features, and the higher-order co-occurrence features.

3. Detection Evolution

To effectively use the MOCO descriptor for object detection, in embodiments, an iterative framework is used that allows the detector to evolve and achieve better accuracy. Such a concept of detection "evolution" had been successfully used for pedestrian detection in Contextual Boost by the inventors, as previously mentioned. In embodiments, the MOCO-based evolution framework may be extended to general object detection tasks that do not limit to the family of boosting methods and integrate the framework with deformable-part models, such as those discussed in P. Felzenszwalb, R. Girshick, D. McAllester, D. Ramanan, "Object Detection with Discriminatively Trained Part Based Models," in IEEE Transactions on Pattern Analysis and Machine Intelligence, Vol. 32, No. 9, September 2010 [hereinafter, "Reference 3" or "Ref. 3"]; and R. B. Girshick, P. F. Felzenszwalb, and D. McAllester, Discriminatively trained deformable part models, release 5, which is available at http://people.cs.uchicago.edu/~rbg/latent-release5/ [hereinafter, "Reference 4" or "Ref. 4"]. Each of the aforementioned items is incorporated by reference herein in its entirety.

a. Feature Selection

Embodiments of the detector use the MOCO descriptor together with the non-context image features extracted in each scan window in the final classification process. The image features can further comprise more than one descriptor that is computed from different perspectives, e.g., the FHOG descriptors for different parts in the deformable-part-model (of Ref. 3 and Ref. 4. As a result, the dimension of the combined feature descriptor can be very high, sometimes more than 10,000 dimensions. Feeding such features to a general classification algorithm can be unnecessarily expensive. Therefore, a step of feature selection may be employed when constructing the classifiers at each iteration of detection evolution. Many popular feature selection algorithms have been proposed, such as Boosting or Multiple Kernel Learning. Either of them may be used herein. In experiments by the authors, boosting, such as that described by J. Friedman, T. Hastie, and R. Tibshirani in "Additive logistic regression: a statistical view of boosting," Annals of Statistics (2000) [hereinafter, "Reference 5" or "Ref. 5"] (which is incorporated by reference herein in its entirety), was used for feature selection.

b. General Evolution Algorithm

In embodiments, given an initial baseline detector, the iteration procedure for training a new evolving detector is as follows. As graphically depicted in FIG. 1, an input image (e.g., input image 105) with ground truth label (dotted rectangle 115) is shown at top-right corner. As shown in FIG. 1, the framework evolves the detector using higher-order context until a stop condition is reached, such as convergence.

Figure 6:
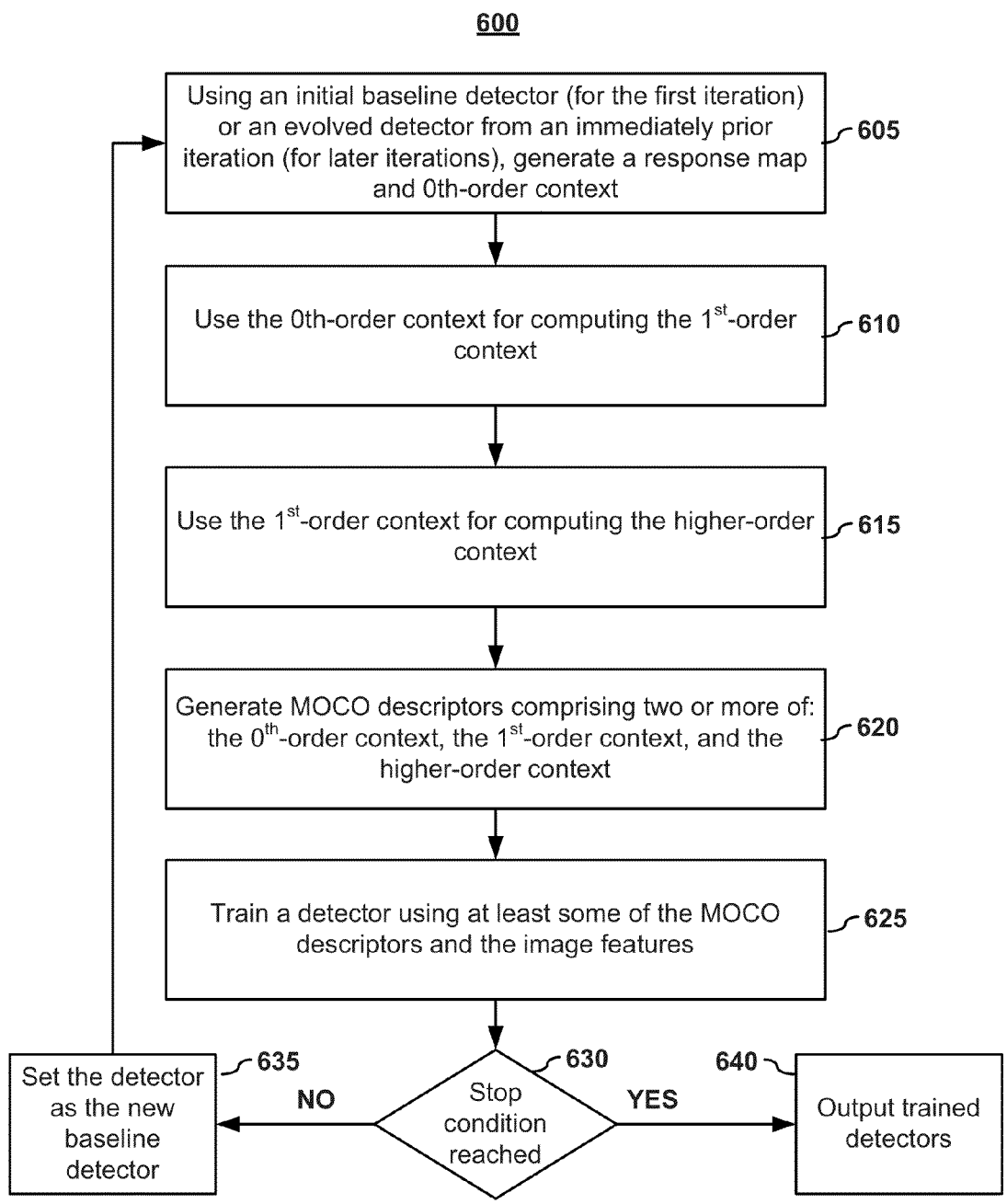
FIG. 6 depicts a methodology for evolving a detector according to embodiments of the present invention.

FIG. 6 depicts a methodology for evolving a detector according to embodiments of the present invention. First, a baseline detector is used to calculate (605) the response maps. At each iteration, the response map and 0th-order context is computed (605) using the initial baseline detector (for the $1^{st}$ iteration) or the evolved detector from the prior iteration (for later iterations). Then, the $0^{th}$-order context is used for computing (610) the $1^{st}$-order context, upon which higher-order co-occurrence descriptors are computed (615). The multi-order co-occurrence (MOCO) descriptors comprising the 1st-order context and the higher-order context are generated (620). One skilled in the art shall recognize that the MOCO may comprise additional or fewer elements.

Thus, the MOCO as well as the image features are extracted on all the training samples. In embodiments, bootstrapping is used to iteratively add hard samples to avoid over-fitting. In embodiments, feature selection is applied to select the most meaningful features amongst the MOCO and image features.

Finally, in embodiments, the selected features are fed into a general classification algorithm to construct (625) a new detector, which will serve as the new detector (635) for the next iteration. As the MOCO is defined in a context region, the iteration will automatically propagate context cues to larger and larger regions. As a result, more and more context will be incorporated through the iterations, and the evolved detectors can yield better performance. The iteration process stops (630) when a stop condition has been reached and the trained detectors for each iteration are output (640). For example, the iteration process may stop when the performances of the evolving detectors converge or when a certain number of iterations have occurred. One skilled in the art shall recognize that other stop conditions may be employed. The evolution eliminates many false positives using implicit contextual information and fortifies the true detections.

In embodiments of the testing/detecting stage, the same or similar evolution procedure may be applied using the trained detectors respectively. For example, image features are initially extracted from an input image. A baseline detector, such as a deformable parts model (as discussed in the next section), may be used to calculate the response maps, and context basis (0th-order) formed. For each of a set of local scan windows, the $0^{th}$-order context is used for computing the $1^{st}$-order context, and $1^{st}$-order context is used to compute the higher-order co-occurrence descriptor, as previously described. A multi-order co-occurrence (MOCO) descriptor may be generated comprising a combination of two or more of the $0^{th}$-order context, the $1^{st}$-order context, and the higher-order context. A contextual feature set comprising the image features and the MOCO may be formed.

In embodiments, the trained detector(s) obtained from the detector training evolution process are used in their corresponding iterations of the testing/detecting. In embodiments, at the first iteration, the trained detector(s) from the first iteration of the evolution training process are applied to the contextual feature sets to compute a new response map. The response map become the input for the next iteration, and the process repeats in which $0^{th}$, $1^{st}$, and higher-order features are obtained based upon the new response map. In embodiments, a contextual feature set for a local window is augmented by the MOCO for the current iteration. For example, an augmented contextual feature set at the second iteration may comprise the image features, the MOCO from the first iteration, and the MOCO from the current (i.e., $2^{nd}$) iteration. The corresponding trained detector(s) (i.e., the detectors from the second training iteration) are applied to the augmented contextual feature sets to obtain the new response map for the next iteration (if there is one—depending upon how many iteration existed in the training phase).

In embodiments, after the last iteration, final contextual classifier responses are output. In embodiments, the final classifier response of each window may be compared with one or more thresholds to decide whether the window does or does not contain an object of interest.

c. Integration with Deformable-Part-Model

The deformable-part-model approach has achieved significant success for general object detection tasks. The basic idea is to define a coarse root filter that approximately covers an entire object and higher resolution part filters that cover smaller parts of the object. The relationship between the root and the parts is modeled in a star structure as, $$s_f = s_r + \sum_{i=1}^{N_p} (s_{p_i} - d_i), \tag{6}$$

where $s_r$ is the detection score of the root filter, $s_{p_i}$ and $d_i$ respectively represent the detection score and deformation cost of the i-th part filter, and $N_p$ is the number of part filters. In embodiments, the star-structural constraints and the final detection are achieved using a latent-SVM model.

From the viewpoint of context, the deformable-part-model essentially exploits the intra context inside the object region, e.g., various arrangements of different parts. In contrast, the MOCO deals with the co-occurrence of scanning windows that cover the object region and its neighborhood. Therefore, it exploits the inter context around the object region. Clearly these two kinds of context are exclusive and complementary to each other. Thus, in embodiments, these elements may be combined together to provide more comprehensive contextual constraints.

Note that Equation (6) comprises both the final detection response $s_f$ and the detection responses $s_{p_i}$ from the $N_p$ part filters. Since each response s corresponds to a response map, the MOCO descriptors may be calculated using each of the response maps. The same procedure of computing the MOCO descriptors $f_c$ may be followed for the root filter from $s_f$ to obtain the MOCO descriptors $f'_{c_i}$ for parts on $s_{p_i}$. Furthermore, in embodiments, to effectively evolve the baseline deformable-part-model detector using the calculated MOCO, the iterative framework may be applied not only on the root filter but also on part filters and detectors for every component. The detailed training procedure for integrating our MOCO and the deformable-part-model is summarized in Algorithm 1, which is shown in FIG. 7. The input to the algorithm includes the training dataset $S_{train}$ and the deformable-part-model $\Psi_0$ as the initial baseline detector. In each iteration, the same iteration process as in Section 3.b for part filters and the model for each component may be adopted, and evolve the component model accordingly for the next iteration. This step is shown as step 2 in Algorithm 1 (FIG. 7). Then, in embodiments, the latent-SVM is used to fuse the $N_c$ components and retrain an evolved detector for the next iteration. Bootstrapping may again be used to avoid over-fitting. The iteration process stops when a stop condition is reached, such (by way of example and limitation) when it is observed that the detection accuracy rate converges.

4. Experiments and Discussion

Experiments were conducted to evaluate the proposed MOCO and the detection evolution framework. To demonstrate the advantage of this approach, the challenging PASCAL VOC 2007 dataset (i.e., Ref. 1) was used with its 20 categories of objects, which are widely acknowledged as one of the most difficult benchmark datasets for general object detection. The deformable-part-model of Ref. 2 was also used with default setting (e.g., 3 components, each with 1 root and 8 part filters) as the initial baseline detector. First, to demonstrate the advantage of the MOCO, the performance achieved by using different orders of context information were compared. Performances with various parameter settings are shown to demonstrate the characteristics of the MOCO. Second, the performance at different iterations as the detector evolves are compared to show that the detectors quickly converge in about 2~3 iterations. Third, the performance of an embodiment of the methodologies described herein is compared with those of state-of-the-art approaches, and it shows substantial improvement. Furthermore, we also experiment on Caltech pedestrian dataset (i.e., Ref. 2), which was used as the main evaluation benchmark for Contextual Boost of U.S. Patent Publication No. 2012/0219211. The comparisons demonstrate the advantages of embodiments of the novel systems and methodologies presented herein.

a. Multi-order Context Representation

First, the MOCO representation was evaluated and experimented with different parameters settings. Five (5) categories (plane, bottle, bus, person, and tv) from PASCAL VOC 2007 were randomly chosen and experimented on "train" and "val" sets for various parameters. All experiments in this section only use 1-iteration of detection evolution. The mean Average Precisions (mAP) is compared to show how the performance varies with different parameter settings.

Figure 8:
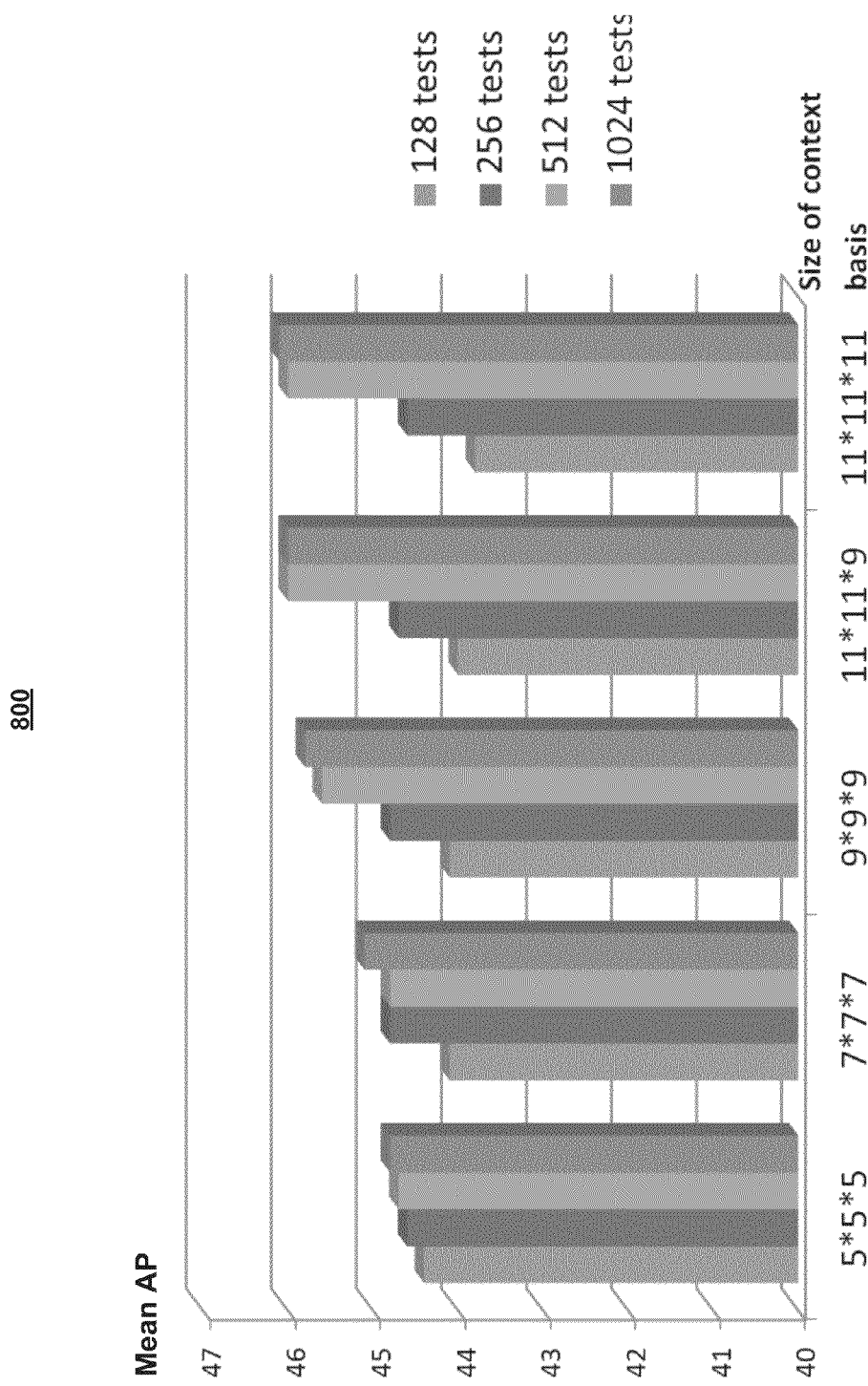
FIG. 8 illustrates how the mean Average Precision (mAP) varies for different parameters, specifically the size W×H×L of context structure $\Omega(\dot{P})$ and the number n of binary comparison tests, according to embodiments of the present invention.

Context Parameters. In embodiments, two important parameters that directly affect the computation of context descriptors are the size of $\Omega_p$ and the number n of binary comparisons. Since the binary comparisons $\{\tau_1, \tau_2, \ldots, \tau_n\}$ are randomly sampled inside the 3D context structure $\Omega(\dot{P})$, the comparison number n may be chosen proportional to the size of $\Omega(\dot{P})$, W×H×L. FIG. 8 illustrates how the mean Average Precision (mAP) varies for different parameters, specifically the size W×H×L of context structure $\Omega(\dot{P})$ and the number n of binary comparison tests, according to embodiments of the present invention. It should be noted that in FIG. 8 only $1^{st}$-order context feature and the image features were used for evaluation. As shown in FIG. 8, bigger size of $\Omega(\dot{P})$ and number n correspond to richer context information and thus yield better performance, yet require more computation. To balance the performance and computational cost, the inventors finally choose 11×11×9 as $\Omega(\dot{P})$ size, and 512 as the binary comparison test number.

Figure 9:
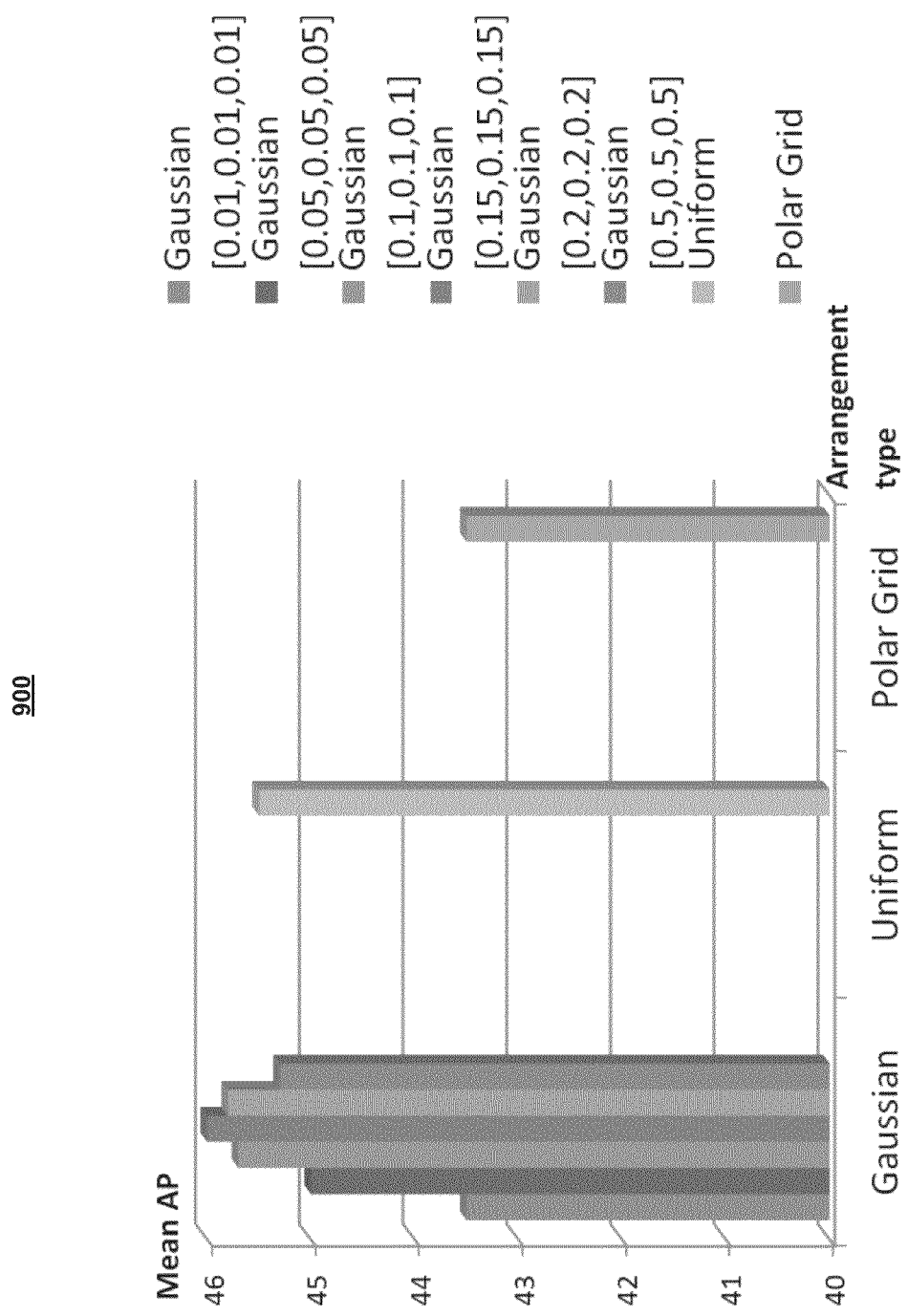
FIG. 9 depicts how the mean Average Precision (mAP) varies for different arrangements according to embodiments of the present invention.

1St-Order Context. According to the analysis in Sec. 2.b.ii, type 3 of Gaussian sampling for constructing the $1^{st}$-order context descriptor was chosen. The detection performances using different Gaussian parameters were compared. FIG. 9 depicts how the mean Average Precision (mAP) varies for different arrangements according to embodiments of the present invention. It should be noted that only $1^{st}$-order context features and the image features is used for evaluation. As shown in FIG. 9, the best accuracy was achieved when the variances in the three dimensions are [0.15, 0.15, 0.15] respectively. FIG. 9 also shows the comparison with the sampling methods of type 1 and type 2, which confirms the advantage of Gaussian sampling.

Higher Order Context. In embodiments, the most important parameter for computing a higher-order context descriptor is the dimension m of the histogram. Since the higher-order context descriptor $f_p$ is complementary to the $1^{st}$-order context feature $f_n$, they are combined when evaluating the detection performance. Table (1) shows the detection accuracy when choosing different values of m, where the best accuracy is achieved when the closeness vector space is divided into m=27 (=$3^3$) subregions.

TABLE (1)

In embodiments, mean AP varies with respect to the length of higher-order co-occurrence feature $f_p$. The higher-order context descriptor together with 1st-order context feature and the image features are used. It should be noted that m = 0 refers to not using any higher-order feature.

| m = 0 | m = 8 | m = 27 | m = 64 | m = 125 |
|---|---|---|---|---|
| 46.0 | 46.3 | 46.7 | 46.5 | 46.1 |

Context in Different Orders. To show that different orders of context provide complimentary constraints for object detection, the detection accuracy using different combinations of the multi-order context descriptors were compared. For $0^{th}$-order context, the best parameter settings presented in U.S. Patent Publication No. 2012/0219211 were chosen. As shown in Table (2), clearly the MOCO descriptor that combines all orders of context achieves the best detection performance. This confirms that none of the multi-order contexts is redundant. Another way of exploring the $1^{st}$-order context is to extract the gradient-based features such as SURF (Speeded-Up Robust Features) or LBP (Local Binary Pattern) directly on each scale of the context structure $\Omega(\dot{P})$. However, in embodiments, it did not help improve the accuracy in the experiments, as shown in Table (2). This means that the context across larger spatial neighborhood or different scales may be more effective than the context conveyed by local gradients between adjacent positions.

TABLE (2)

In embodiments, mean AP (mAP) varies with the combination of different order context feature, where $0^{th}$, $1^{st}$, and H, respectively refers to $0^{th}$, $1^{st}$, and higher-order descriptors. Also compared were SURF and LBP extracted on each level of context structure $\Omega(\dot{P})$.

| $0^{th}$ | $1^{st}$ | $1^{st}+H$ | $0^{th}+1^{st}$ | $0^{th}+1^{st}+H$ | SURF | LBP |
|---|---|---|---|---|---|---|
| 45.5 | 46.0 | 46.7 | 46.8 | 47.2 | 44.7 | 45 | b. Detector Evolution

Using the best parameters for the MOCO descriptor obtained using the "train" and "val" datasets, the detector evolution process was evaluated across iterations. The entire PASCAL dataset was used as the testbed, e.g., training on "trainval" and testing on "test". Algorithm (1), as shown in FIG. 7, was used and the detection accuracy compared through the iterations. For most categories, the framework converged at the second or third iteration. To better show the trend of the detector evolution process, the process was kept running for six (6) iterations. As shown in Table (3), the accuracy steadily improved through iterations and converged quickly.

TABLE (3)

In embodiments, the mean AP (mAP) varies with respect to the proposed detection evolution algorithm, where 0-iteration in the left refers to the baseline without detection evolution.

| 0 | 1 | 2 | 3 (converged) | 4 | 5 | 6 |
|---|---|---|---|---|---|---|
| 35.4 | 37.6 | 38.3 | 38.7 | 38.8 | 38.7 | 38.7 | c. Comparison with State of Art

Finally, the overall performance of an embodiment of the present methodology was compared with the state of art.

PASCAL VOC 2007. An embodiment of the present methodology was first compared with state-of-the-art approaches on PASCAL dataset in Reference 1. As shown in Table (4) which is provided in FIG. 10, the test embodiment of the present methodology stably outperforms the baselines in Reference 4 in all 20 categories. Especially on the categories of sheep, tv, and monitor, the test embodiment of the present methodology achieved significant AP improvements by 6.6%, 5.7%. When compared with other prior approaches, the experimental embodiment of the present methodology outperformed 12 of 20 categories, and achieved the highest mean AP (mAP) at 38.7, outperforming the deformable model (ver.5) of Reference 4 by 3.3%. The additional prior approaches referenced in Table (4) are: L. Zhu, Y. Chen, A. Torralba, A. Yuille and W. T. Freeman, "Latent Hierarchical Structural Learning for Object Detection," in IEEE Conf. on Computer Vision and Pattern Recognition (CVPR), 2010 [hereinafter, "Reference 6" or "Ref. 6"]; C. Li, D. Parikh, and T. Chen, "Extracting adaptive contextual cues from unlabeled regions," in IEEE International Conference on Computer Vision (ICCV), 2011 [hereinafter, "Reference 7" or "Ref. 7"]; Z. Song, Q. Chen, Z. Huang, Y. Hua, and S. Yan, "Contextualizing object detection and classification," in IEEE Conf. on Computer Vision and Pattern Recognition (CVPR), 2011 [hereinafter, "Reference 8" or "Ref. 8"]; M. V. A. Vedaldi, V. Gulshan, and A. Zisserman, "Multiple kernels for object detection," in IEEE International Conference on Computer Vision (ICCV), 2009 [hereinafter, "Reference 9" or "Ref. 9"]; and J. Zhang, K. Huang, Y. Yu, and T. Tan, "Boosted local structured HOG-LBP for object localization," in IEEE Conf. on Computer Vision and Pattern Recognition (CVPR), 2010 [hereinafter, "Reference 10" or "Ref. 10"]. Each of the foregoing is incorporated by reference herein in its entirety.

Caltech Pedestrian Dataset. An embodiment of the present methodology was also applied to the Caltech pedestrian dataset of Reference 2. The same experimental setup as in U.S. Patent Publication No. 2012/0219211 and Ref. 2 was used for evaluations. LBP was used to capture the texture information and FHOG (Ref. 10) was used to describe the shape information, and only "reasonable" pedestrians of 50 pixels or taller with no occlusion or part occlusion were considered. The test embodiment was compared with the state-of-the-art results surveyed in P. Dollár, C. Wojek, B. Schiele, and P. Perona in "Pedestrian detection: An evaluation of the state of the art," IEEE Transactions on Pattern Analysis and Machine Intelligence (TPAMI), 2011 (which is incorporated by reference herein in its entirety). These state-of-art approaches include: (1) the Viola-Jones object detection framework (see, e.g., P. Viola and M. Jones, "Robust real-time object detection," International Journal of Computer Vision (IJCV), 2002); (2) Shapelet (see, e.g., P. Sabzmeydani and G. Mori, "Detecting pedestrians by learning shapelet features," IEEE Computer Vision and Pattern Recognition (CVPR), 2007); (3) Feature Mining (FtrMine) (see, e.g., P. Dollar, Z. Tu, H. Tao, and S. Belongie, "Feature mining for image classification," IEEE Computer Vision and Pattern Recognition (CVPR), 2007); (4) LatSVM-V2 (see, e.g., P. Felzenszwalb, R. Girshick, and D. McAllester, "Cascade Object Detection with Deformable Part Models," In Proceedings of the IEEE Computer Vision and Pattern Recognition (CVPR) 2010); (5) Histogram Intersection Kernel and Support Vector Machine (HikSVM) (see, e.g., S. Maji, A. C. Berg, and J. Malik, "Classification using intersection kernel support vector machines is efficient," IEEE Computer Vision and Pattern Recognition (CVPR), 2008); (6) Histogram of Oriented Gradients (HOG) (see, e.g., N. Dalal, B. Triggs, "Histograms of oriented gradients for human detection," IEEE Computer Vision and Pattern Recognition (CVPR), page 1:886-893, 2005); (7) MultiFtr+CCS (see, e.g., S. Walk, N. Majer, K. Schindler, and B. Schiele, "New features and insights for pedestrian detection," IEEE Computer Vision and Pattern Recognition (CVPR), pages 1030-1037, 2010); (8) MultiFtr+ Motion (see, e.g., S. Walk, N. Majer, K. Schindler, and B. Schiele, "New features and insights for pedestrian detection," IEEE Computer Vision and Pattern Recognition (CVPR), pages 1030-1037, 2010); (9) Channel Features (ChnFtrs) (see, e.g., P. Dollar, Z. Tu, P. Perona, and S. Belongie, "Integral channel features," in British Machine Vision Conference (BMVC), 2009); (10) MultiFtr (see, e.g., C. Wojek and B. Schiele, "A performance evaluation of single and multi-feature people detection," in Proceedings of the 30th DAGM symposium on Pattern Recognition, pages 82-91, 2008); (11) Histogram of Oriented Gradient-Local Binary Pattern (HogLbp) (see, e.g., X. Wang, T. X. Han, and S. Yan, "An HOG-LBP human detector with partial occlusion handling," in Proceedings of International Conference on Computer Vision (ICCV), pages 32-39, 2009); (12) FPDW (see, e.g., P. Dollár, S. Belongie, and P. Perona, "The fastest pedestrian detector in the west," in British Machine Vision Conference (BMVC), 2001); (13) FeatSynth (see, e.g., A. Bar-Hillel, D. Levi, E. Krupka, and C. Goldberg, "Part-based feature synthesis for human detection," in European Conference on Computer Vision (ECCV), pages 127-142, 2010); and (14) Poslnv (see, e.g., Z. Lin and L. S. Davis, "A pose-invariant descriptor for human detection and segmentation," in European Conference on Computer Vision (ECCV), pages 423-436, 2008). Each of the above-referenced items is incorporated herein by reference in its entirety.

Figure 11:
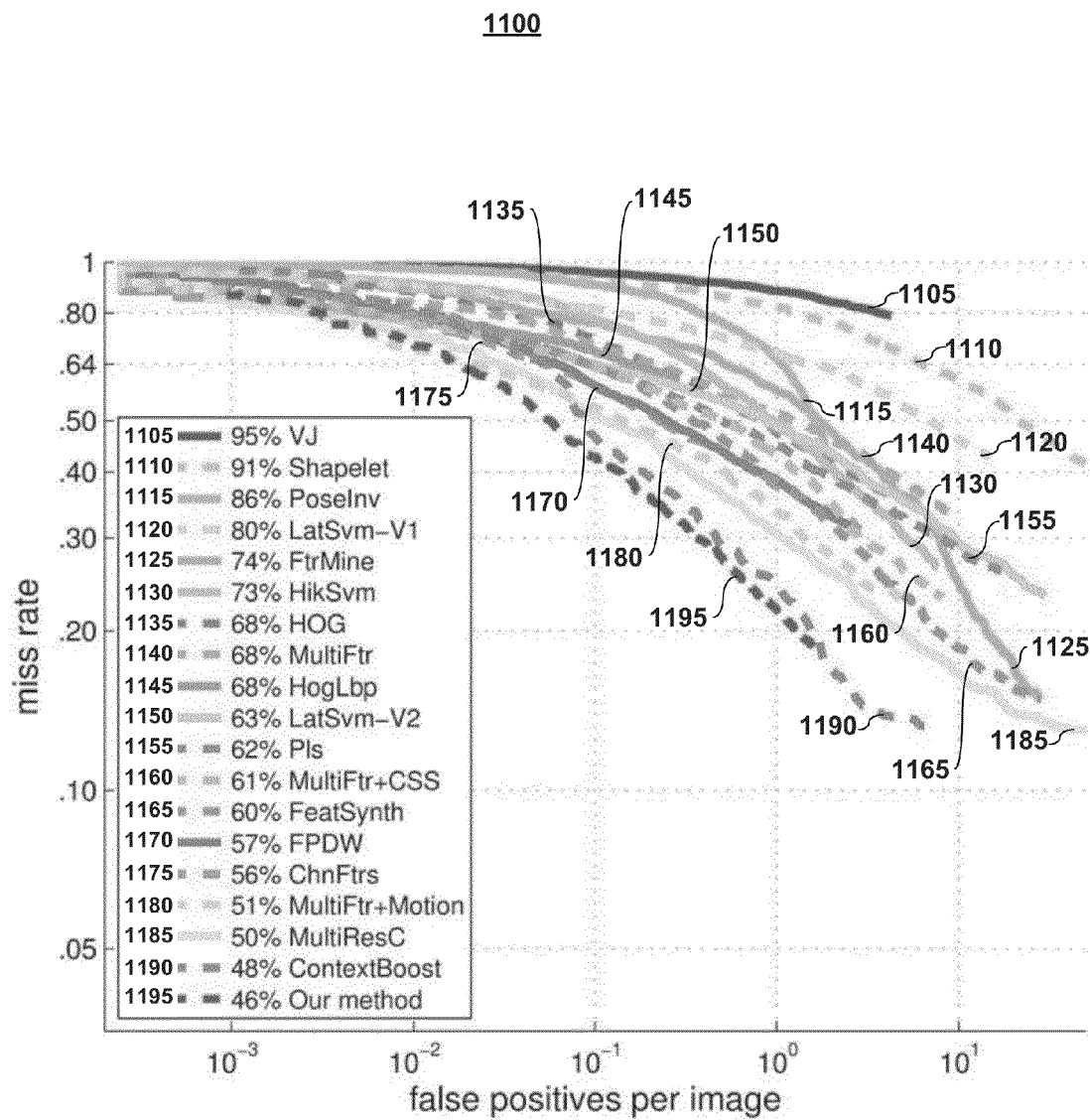
FIG. 11 depicts a comparison of a test algorithm with state-of-art approaches in the Caltech Pedestrian test dataset, according to embodiments of the present invention.

FIG. 11 depicts a comparison of a test algorithm with state-of-art approaches in the Caltech Pedestrian test dataset, according to embodiments of the present invention. As shown in FIG. 11, the best reported log-average miss rate is 48% by a method of U.S. Patent Publication No. 2012/0219211 (Contextual Boost), while the test embodiment further lowers the miss rate to 46%. If the miss rate at one (1) FPPI is considered, the best reported result is 25% by the method of U.S. Patent Publication No. 2012/0219211, and the test embodiment achieves 23%.

d. Processing Speed

In embodiments, the detection evolution framework evaluated each test image $N_d$ times, where $N_d$ is the number of evolved detectors. The experiments show that it generally converges after 2 or 3 iterations and thus the computational cost would be around 2 or 3 times of the deformable part models (ver.5) of Ref. 4. On the PASCAL dataset (Ref. 1), for a 500×375 images, it took about 12 seconds. In embodiments, one way to speed up the detection is to adopt a cascade scheme. In that case most negative candidates can be rejected in early cascades, and the detection could be around 10 times faster.

5. Conclusion

Presented herein are novel multi-order context representations that effectively exploit co-occurrence contexts of different objects, denoted as multi-order contextual co-occurrence (MOCO). In embodiments, only detectors for a single object were used. The detector response map may be pre-processed, and $1^{st}$-order context features may be extracted based on randomized binary comparison. In embodiments, a higher-order co-occurrence descriptor is developed based on the $1^{st}$-order context, which together may comprise a MOCO descriptor and may be integrated into a "detection evolution" framework. Furthermore, in embodiments, the multi-order context representation may be combined with deformable part models (e.g., Ref. 4) to supply a comprehensive coverage over both inter-contexts among objects and inner-context inside the target object region. One skilled in the art shall recognize that the MOCO may be extended to temporal context from videos and contexts from multiple object detectors or multi-class problems.

6. Computing System Embodiments

Figure 12:
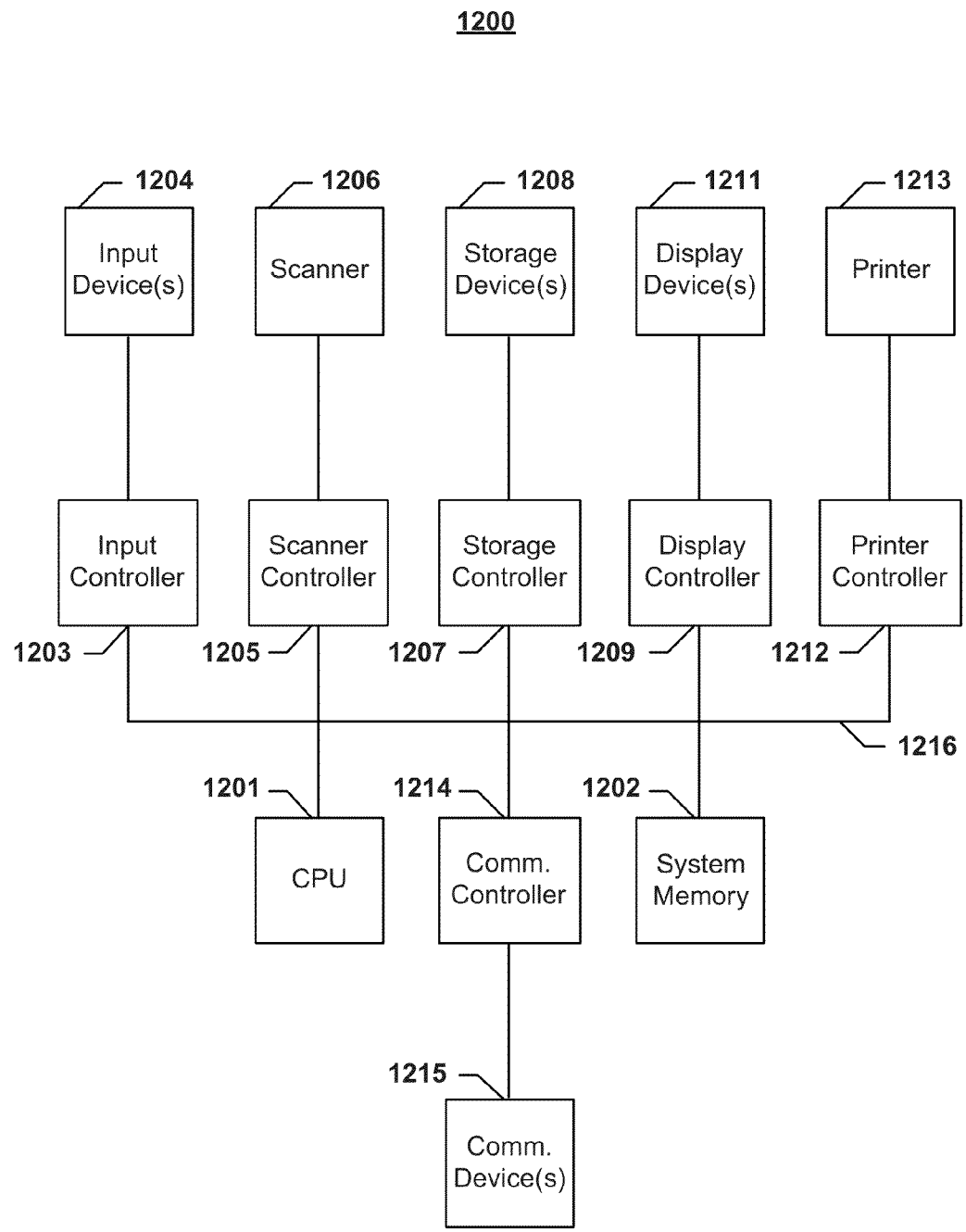
FIG. 12 depicts a block diagram illustrating an exemplary computing system which may be used to implement aspects of the present invention.

Having described the details of the invention, an exemplary system 1200, which may be used to implement one or more of the methodologies of the present invention, will now be described with reference to FIG. 12. As illustrated in FIG. 12, the system includes a central processing unit (CPU) 1201 that provides computing resources and controls the computer. The CPU 1201 may be implemented with a microprocessor or the like, and may also include a graphics processor and/or a floating point coprocessor for mathematical computations. The system 1200 may also include system memory 1202, which may be in the form of random-access memory (RAM) and read-only memory (ROM).

A number of controllers and peripheral devices may also be provided, as shown in FIG. 12. An input controller 1203 represents an interface to various input device(s) 1204, such as a keyboard, mouse, or stylus. There may also be a scanner controller 1205, which communicates with a scanner 1206. The system 1200 may also include a storage controller 1207 for interfacing with one or more storage devices 1208 each of which includes a storage medium such as magnetic tape or disk, or an optical medium that might be used to record programs of instructions for operating systems, utilities and applications which may include embodiments of programs that implement various aspects of the present invention. Storage device(s) 1208 may also be used to store processed data or data to be processed in accordance with the invention. The system 1200 may also include a display controller 1209 for providing an interface to a display device 1211, which may be a cathode ray tube (CRT), a thin film transistor (TFT) display, or other type of display. The system 1200 may also include a printer controller 1212 for communicating with a printer 1213. A communications controller 1214 may interface with one or more communication devices 1215, which enables the system 1200 to connect to remote devices through any of a variety of networks including the Internet, a local area network (LAN), a wide area network (WAN), or through any suitable electromagnetic carrier signals including infrared signals.

In the illustrated system, all major system components may connect to a bus 1216, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like.

Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

While the inventions have been described in conjunction with several specific embodiments, it is evident to those skilled in the art that many further alternatives, modifications, application, and variations will be apparent in light of the foregoing description. Thus, the inventions described herein are intended to embrace all such alternatives, modifications, applications and variations as may fall within the spirit and scope of the appended claims.

What is claimed is:

1. A computer-implement method comprising:
obtaining a classification response map for an input image using a baseline detector;
generating a first-order descriptor, a first-order descriptor comprising a set of binary values in which each binary value is obtained by assigning a binary value based upon comparison of a pair of classification response values selected from the classification response map; and
generating a higher-order co-occurrence descriptor by performing the steps comprising:
calculating closeness vectors for a set of pairs of classification response values used to form the first-order descriptors relative to a local scan window;
generating a histogram of the closeness vectors; and
generating the higher-order co-occurrence descriptor as a cross product of the histogram.

2. The computer-implement method of claim 1 wherein:
a closeness vector measuring an absolute difference of locations of a pair of classification response values.

3. The computer-implement method of claim 1 further comprising:
forming a multi-order contextual co-occurrence descriptor comprising the first-order descriptor and the higher-order co-occurrence descriptor.

4. The computer-implement method of claim 3 further comprising:
evolving a detector trained using a descriptor comprising the multi-order contextual co-occurrence descriptor by iteratively adding an updated multi-order contextual co-occurrence descriptor to the descriptor at each iteration until a stop condition is reached.

5. The computer-implement method of claim 4 wherein a stop condition comprises at least one of:
convergence of the detector between iterations; and
a number of iterations have been reached.

6. The computer-implement method of claim 1 further comprising:
selecting pairs of classification response values to form the first-order descriptor is based upon a Gaussian distribution around a local scan window of interest.

7. The computer-implement method of claim 1 wherein the step of obtaining a classification response map for an input image using a baseline detector comprising:
using logistic regression on response values from the baseline detector to obtain the response map.

8. A system comprising:
one or more processors; and
a non-transitory computer-readable medium or media comprising one or more sequences of instructions which, when executed by the one or more processors, causes steps to be performed comprising:
obtaining a classification response map for an input image using a baseline detector;
generating a first-order descriptor, a first-order descriptor comprising a set of binary values in which each binary value is obtained by assigning a binary value based upon comparison of a pair of classification response values selected from the classification response map; and
generating a higher-order co-occurrence descriptor by performing the steps comprising:
calculating closeness vectors for a set of pairs of classification response values used to form the first-order descriptors relative to a local scan window;
generating a histogram of the closeness vectors; and
generating the higher-order co-occurrence descriptor as a cross product of the histogram.

9. The system of claim 8 wherein the one or more sequences of instructions further comprises:
a closeness vector measuring an absolute difference of locations of a pair of classification response values.

10. The system of claim 8 wherein the one or more sequences of instructions further comprises:
forming a multi-order contextual co-occurrence descriptor comprising the first-order descriptor and the higher-order co-occurrence descriptor.

11. The system of claim 10 wherein the one or more sequences of instructions further comprises:
evolving a detector trained using a descriptor comprising the multi-order contextual co-occurrence descriptor by iteratively adding an updated multi-order contextual co-occurrence descriptor to the descriptor at each iteration until a stop condition is reached.

12. The system of claim 11 wherein a stop condition comprises at least one of:
convergence of the detector between iterations; and
a number of iterations have been reached.

13. The system of claim 8 wherein the one or more sequences of instructions further comprises:
selecting pairs of classification response values to form the first-order descriptor is based upon a Gaussian distribution around a local scan window of interest.

14. The system of claim 8 wherein the step of obtaining a classification response map for an input image using a baseline detector comprising:
using logistic regression on response values from the baseline detector to obtain the response map.

15. The system of claim 8 wherein the step of obtaining a classification response map for an input image using a baseline detector comprising:
using a pre-trained model to obtain the detector response map that captures intra context.

16. The system of claim 15 wherein the pre-trained model is a deformable parts model and a plurality of detector response maps are generated.

* * * * *